United States Patent [19]

Jan et al.

[11] Patent Number: 5,268,694
[45] Date of Patent: Dec. 7, 1993

[54] COMMUNICATION SYSTEM EMPLOYING SPECTRUM REUSE ON A SPHERICAL SURFACE

[75] Inventors: Yih G. Jan, Chandler; Kenneth M. Peterson, Phoenix, both of Ariz.

[73] Assignee: Motorola, Inc., Schaumburg, Ill.

[21] Appl. No.: 909,487

[22] Filed: Jul. 6, 1992

[51] Int. Cl.$^5$ .................. H04B 7/185; H04B 1/10; H04Q 7/00; H04M 9/00
[52] U.S. Cl. .................. 342/354; 455/33.1; 455/33.4; 455/63; 379/60
[58] Field of Search .............. 342/352, 354; 455/33.1, 455/33.2, 33.4, 73, 103, 63; 379/59, 60

[56] References Cited

U.S. PATENT DOCUMENTS

| | | | |
|---|---|---|---|
| 4,128,740 | 12/1978 | Graziano | 455/33.1 |
| 4,384,362 | 5/1983 | Leland | 455/33.1 |
| 4,823,341 | 4/1989 | Rosen | 370/75 |
| 5,047,762 | 9/1991 | Bruckert | 455/63 |

OTHER PUBLICATIONS

An article entitled "Advanced Mobile Phone Service: The Cellular Concept" by V. H. Mac Donald, Copyright 1979, The Bell System Technical Journal, vol. 58, No. 1, Jan. 1979, pp. 15–41.

*Primary Examiner*—Gregory C. Issing
*Attorney, Agent, or Firm*—Robert M. Handy

[57] ABSTRACT

Orbiting satellites project footprints on the earth. Each footprint is divided into cells. Footprints of nearby satellites overlap one another, and the overlap increases as satellites approach a pole from the equator. The positions of all cells generated by all satellites are simulated at numerous points throughout an orbit. Cells are marked as being active or inactive to compensate for the overlap at each simulated point. Channel sets are assigned to cells within a reference footprint, and this assignment is propagated throughout all footprints in the referenced footprint's orbit. The channel set sequences are propagated to other orbits after taking into account inactive cells located near boundaries between the orbits. Each satellite stores channel set assignments for its cells at the various points throughout its orbit. All satellites switch their communication parameters at the same instant in response to the channel set assignments.

20 Claims, 12 Drawing Sheets

| ROW SEQUENCE TABLE | |
|---|---|
| LEFT CELL ASSIGNMENT | RIGHT CELL ASSIGNMENT |
| A | B |
| B | C |
| C | D |
| D | E |
| E | F |
| F | A |
| G | H |
| H | I |
| I | J |
| J | K |
| K | L |
| L | G |

*FIG. 7*

| CELL LOCATION TABLE ||||||||
|---|---|---|---|---|---|---|
| SUBJECT CELL | UP RIGHT | RIGHT | DOWN RIGHT | DOWN LEFT | LEFT | UP LEFT |
| 1 |  | RP-25 | S-02 | S-04 | S-03 | P-13 |
| 2 | RP-25 | RP-27 | S-09 | S-05 | S-04 | S-01 |
| ... | ... | ... | ... | ... | ... | ... |
| 7 | RP-20 | RP-19 | RF-31 | S-08 | S-10 | S-09 |
| 8 | S-07 | RF-31 | RF-33 | S-15 | S-11 | S-10 |
| 9 | RP-27 | RP-20 | S-07 | S-10 | S-05 | S-02 |
| ... | ... | ... | ... | ... | ... | ... |
| 13 | S-15 | RF-25 |  | F-01 | S-14 | S-16 |
| 14 | S-16 | S-13 | F-01 | F-03 | S-21 | S-17 |
| ... | ... | ... | ... | ... | ... | ... |
| 25 | S-26 | S-28 | S-27 | LF-02 | LF-01 | LP-13 |
| ... | ... | ... | ... | ... | ... | ... |
| 37 | S-06 | S-12 | S-18 | S-24 | S-30 | S-36 |

LEGEND

S - SAME FOOTPRINT.
P - FOOTPRINT PRECEDING THIS FOOTPRINT.
RP - FOOTPRINT TO THE RIGHT OF AND PRECEDING THIS FOOTPRINT.
RF - FOOTPRINT TO THE RIGHT OF AND FOLLOWING THIS FOOTPRINT.
F - FOOTPRINT FOLLOWING THIS FOOTPRINT.
LP - FOOTPRINT TO THE LEFT OF AND PRECEDING THIS FOOTPRINT.
LF - FOOTPRINT TO THE LEFT OF AND FOLLOWING THIS FOOTPRINT.

*FIG. 8*

COMMUNICATION SYSTEM EMPLOYING SPECTRUM REUSE ON A SPHERICAL SURFACE

RELATED PATENT

The present invention is related to "Satellite System Cell Management" by Pullman et al., Ser. No. 07/812,389, filed Dec. 23, 1991, assigned to the assignee of the present invention, and incorporated herein by reference.

TECHNICAL FIELD OF THE INVENTION

The present invention relates generally to communication systems. More specifically, the present invention relates to systems that divide an area within which communications are to take place into cells and which reuse spectrum among certain ones of the cells.

BACKGROUND OF THE INVENTION

Conventional cellular communication systems adopt a frequency reuse plan. Generally speaking, system antennas are erected at spaced apart locations. Each system antenna, along with transmitter power, receiver sensitivity, and geographical features, defines a cell. A cell is a geographical area on the surface of the earth within which communications may take place via a subscriber unit having predetermined operating characteristics and via the cell's antenna. In a cellular system that efficiently uses the spectrum allocated to it, system antennas are located to minimize overlap between their respective cells and to reduce gaps between the cells.

The spectrum allocated to a conventional cellular system is divided into a few discrete portions, typically frequency bands. Each cell is allocated only one of the discrete portions of the spectrum, and each cell is preferably surrounded by cells that use other discrete portions of the spectrum. Communications within a cell use only the discrete portion of the spectrum allocated to the cell, and interference between communications taking place in other nearby cells is minimized because communications in such nearby cells use different portions of the spectrum. Co-channel cells are cells that reuse the same discrete portion of spectrum. To minimize interference, the frequency reuse plan spaces co-channel cells a predetermined distance apart.

A cellular communication system which places antennas in moving orbits around the earth faces particular problems related to distributing discrete portions of the allocated spectrum to various cells. Due to the approximately spherical shape of the earth, cells which do not overlap in one region of the earth, such as the equator, may very well overlap in other regions, such as polar regions. When cells overlap, the co-channel cells that the overlapping cells are spacing apart reside closer together than permitted by the spectrum reuse plan. Interference between communications taking place in such closely spaced co-channel cells becomes more likely.

In addition, when antennas move relative to each other, the overlap between cells changes as a function of time. Any allocation of discrete portions of the spectrum to the cells remains valid only until relative movement of the antennas causes the overlap between the cells to change.

SUMMARY OF THE INVENTION

Accordingly, it is an advantage of the present invention that an improved communication system is provided.

Another advantage of the present invention is that a cellular communication system is provided which efficiently reuses spectrum throughout a spherical surface, such as the surface of the earth, to increase channel capacity given a fixed frequency spectrum.

Yet another advantage is that the present invention operates a cellular communication system's antennas when the antennas project overlapping cells.

Still another advantage is that the present invention provides a communication system that dynamically assigns discrete portions of spectrum to cells to compensate for varying overlap between the cells.

The above and other advantages of the present invention are carried out in one form by an improved method of operating first and second spaced apart antennas. The first and second antennas project first and second footprints, respectively. These first and second footprints are each divided into a plurality of cells. The method calls for positioning the antennas so that the first and second footprints overlap. The cells of the footprints are defined as being active or inactive in response to the overlap. Channels are assigned to the active ones of the cells from the first and second footprints in accordance with a spectrum reuse plan that maintains a minimum predetermined separation distance between co-channel cells.

The above and other advantages of the present invention are carried out in another form by an improved method of reusing spectrum on an approximately spherical surface. The method calls for simulating locations for first and second footprints projected on the surface from corresponding first and second antennas positioned outside the surface. Each footprint is divided into a plurality of cells, and the first and second footprints at least partially overlap one another. Channels of the spectrum are assigned to the first footprint cells in accordance with a spectrum assignment plan that spaces co-channel cells a predetermined minimum distance apart. Active and inactive cells are defined. The inactive cells are located near a boundary between the first and second footprints to compensate for overlap therebetween. Channels of the spectrum are assigned to the active cells of the second footprint. The second footprint cells are determined in response to the active cells assigned to the first footprint and to the inactive cells defined for the first and second footprints to maintain approximately the minimum distance between active co-channel cells on opposing sides of the boundary. Communications take place through the antennas in accordance with the assignments of the channels to the active cells in the first and second footprints.

BRIEF DESCRIPTION OF THE DRAWINGS

A more complete understanding of the present invention may be derived by referring to the detailed description and claims when considered in connection with the Figures, wherein like reference numbers refer to similar items, throughout the Figures, and:

FIG. 7 shows a block diagram of a row sequence table used by the procedure depicted in FIG. 5;

FIG. 8 shows a block diagram of a cell location table used by the procedure depicted in FIG. 5;

DETAILED DESCRIPTION OF THE PREFERRED EMBODIMENTS

Figure 1:
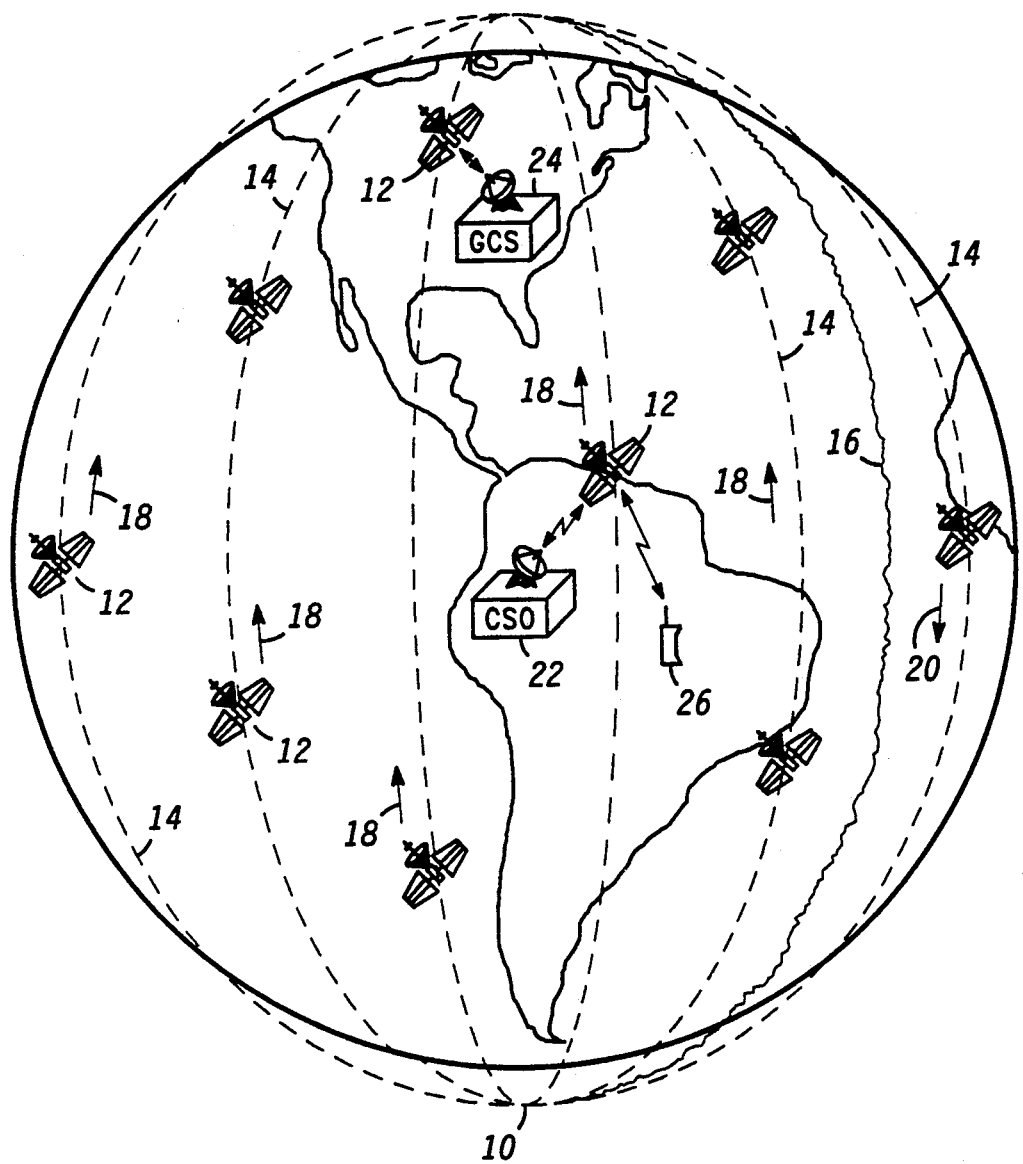
FIG. 1 shows a layout diagram of a satellite-based cellular communication system.

FIG. 1 illustrates a satellite-based communication network 10. Network 10 is dispersed over the earth through the use of several above-the-earth communication nodes, such as orbiting satellites 12. In the preferred embodiment, satellites 12 occupy polar, low-earth orbits 14. In particular, the preferred embodiment of network 10 uses seven polar orbits, with each orbit holding eleven satellites 12. For clarity, FIG. 1 illustrates only a few of these satellites 12.

Orbits 14 and satellites 12 are distributed around the earth. In the example depicted by the preferred embodiment, each orbit 14 encircles the earth at an altitude of around 765 km. Due to the relatively low orbits of satellites 12, substantially line-of-sight electromagnetic transmissions from any one satellite cover a relatively small area of the earth at any point in time. For example, when satellites 12 occupy orbits at around 765 km above the earth, such transmissions cover "footprint" areas around 4075 km in diameter.

Due to the low-earth character of orbits 14, satellites 12 travel with respect to the earth at around 25,000 km/hr. This allows a satellite 12 to be within view of a point on the surface of the earth for a maximum period of around nine minutes. However, satellites 12 form a constellation in which satellites 12 remain relatively stationary with respect to one another, except for two modes of movement.

One mode of movement results from orbits 14 converging and crossing over or intersecting each other in the polar regions. Due to this mode of movement, the distance between satellites 12 that reside in a common orbit 14 remains substantially constant. However, the distance between satellites 12 that reside in adjacent orbits 14 varies with the latitudes of the satellites 12. The greatest distance between these cross-plane satellites 12 exists at the equator. This distance decreases as cross-plane satellites 12 approach the polar regions and increases as cross-plane satellites 12 approach the equator.

A second mode of movement occurs at a constellation seam 16. Seam 16 divides the earth into two hemispheres with respect to the constellation of satellites 12. In one hemisphere, satellites 12 move from south-to-north, as indicated by direction arrows 18 in FIG. 1. In the other hemisphere, satellites 12 move from north-to-south, as indicated by direction arrow 20 in FIG. 1. Seam 16 resides on opposing sides of the earth between a south-north orbit 14 and a north-south orbit 14. At seam 16 satellites 12 approach and pass each other at a rate of around 50,000 km/hr.

Satellites 12 communicate with devices on the ground through many central switching offices (CSOs) 22, of which FIG. 1 shows only one, a few ground control stations (GCSs) 24, of which FIG. 1 shows only one, and any number of radiocommunication subscriber units 26, of which one is shown in FIG. 1. Subscriber units 26 may be located anywhere on the surface of the earth or in the atmosphere above the earth. CSOs 22 are preferably distributed over the surface of the earth in accordance with geo-political boundaries. GCSs 24 preferably reside in extreme northern or southern latitudes, where the convergence of orbits 14 causes a greater number of satellites 12 to come within direct line-of-sight view of a single point on the surface of the earth when compared to more equatorial latitudes. Preferably, around four GCSs 24 are used so that all satellites 12 in the constellation may at some point in their orbits 14 come within direct view of their assigned GCS 24.

Nothing prevents CSOs 22 and GCSs 24 from being located together on the ground. However, CSOs 22 serve a different function from that of GCSs 24. GCSs 24 preferably perform telemetry, tracking, and control (TT&C) functions for the constellation of satellites 12. Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one of satellites 12 is within view of each point on the surface of the earth at all times. Accordingly, network 10 may establish a communication circuit through the constellation of satellites 12 between any two subscriber units 26, between any subscriber unit 26 and a CSO 22, or between any two CSOs 22.

Figure 2:
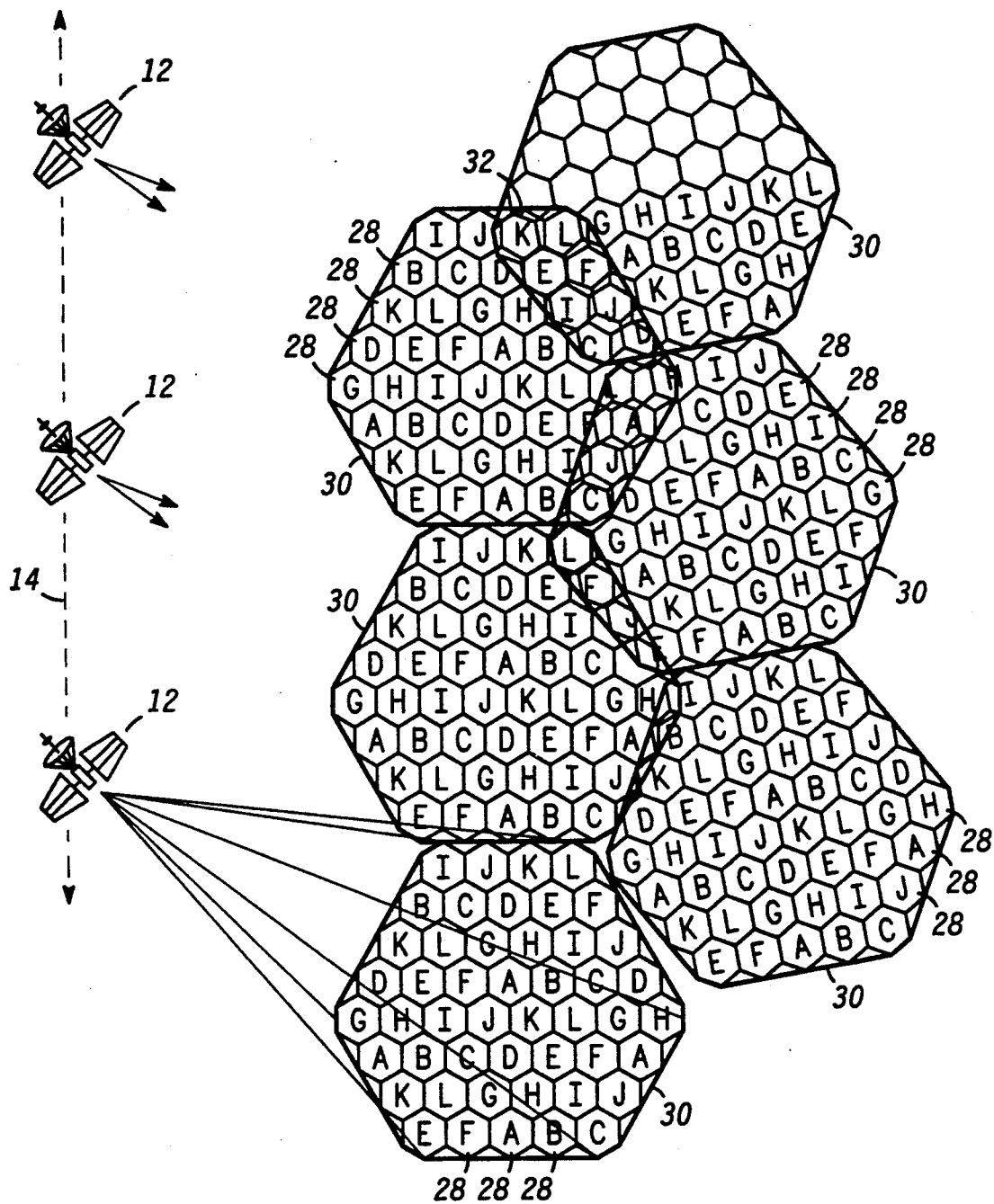
FIG. 2 shows a layout diagram of a portion of a cellular pattern formed on the surface of the earth by antennas placed in orbit around the earth.

FIG. 2 shows a static layout diagram of an exemplary cellular antenna pattern achieved by six of satellites 12, wherein three of the six satellites are sequentially positioned in one orbit 14 and another three of the six satellites 12 are sequentially positioned in an adjacent orbit 14. For clarity, FIG. 2 depicts only the first three of satellites 12.

Each satellite 12 includes an array (not shown) of directional antennas, which may also be viewed as a single multi-directional, multi-beam antenna. Each array projects numerous discrete antenna patterns on the earth's surface at numerous diverse angles away from its satellite 12. FIG. 2 shows a diagram of a resulting pattern of cells 28 that satellites 12 collectively form on the surface of the earth. With satellites 12 positioned at 765 km above the earth, cells 28 are around 690 km in diameter. With satellites 12 traveling at speeds of up to 25,000 km/hr with respect to the earth, cells 28 also travel over the earth at close to this speed, and any given point on the surface of the earth resides within a single cell 28 for no more than around one minute.

The pattern of cells 28 which a single satellite 12 projects on the earth's surface is referred to as a footprint 30. FIG. 2 depicts footprints 30 as each having forty-eight cells 28. However, the precise number of cells 28 included in a footprint 30 is unimportant for the purposes of the present invention. FIG. 2 further illustrates an overlap 32 which results from the above-discussed convergence of orbits 14. The size of overlap 32 varies in response to the location of the overlapping footprints 30. As can be determined by reference to FIGS. 1-2, the greatest amount of overlap 32 occurs in the polar regions of the earth while little or no overlap occurs in the equatorial regions of the earth. Those skilled in the art will appreciate that FIG. 2 represents a static snap-shot of footprints 30, and that the portion of overlap 32 which is associated with any two adjacent cross planar footprints 30 changes as satellites 12 move within orbits 14.

For convenience, FIG. 2 illustrates cells 28 and footprints 30 as being discrete, generally hexagonal shapes without overlap or gaps, other than those attributed to the convergence of orbits 14 near the polar regions of the earth and the divergence of orbits 14 near the equatorial regions of the earth. However, those skilled in the art will understand that in actual practice equal strength lines projected from the antennas of satellites 12 may be more circular or elliptic than hexagonal, that antenna side lobes may distort the pattern, and that some preferably minor overlap between adjacent cells may be expected.

While FIGS. 1-2 and the above-presented discussion describe a preferred orbital geometry for network 10, those skilled in the art will appreciate that the communication nodes which satellites 12 provide need not be positioned precisely as described herein. For example, such nodes may be located on the surface of the earth or in orbits other than those described herein. Likewise, the precise number of nodes may vary from network to network.

The constellation of satellites 12 communicates with all of subscriber units 26 using a limited amount of the electromagnetic spectrum. The precise parameters of this spectrum are unimportant to the present invention and may vary from network to network. The present invention divides this spectrum into discrete portions, hereinafter referred to as channel sets. The precise manner of dividing this spectrum is also unimportant to the present invention. For example, the spectrum may be divided into discrete frequency bands, discrete time slots, discrete coding techniques, or a combination of these. Desirably, each of these discrete channel sets is orthogonal to all other channel sets. In other words, simultaneous communication may take place at a common location over every channel set without significant interference between the channel sets.

Likewise, the precise number of channel sets into which the spectrum is divided is not important to the present invention. FIG. 2 illustrates an exemplary assignment of channel sets to cells 28 in accordance with the present invention and in accordance with a division of the spectrum into twelve discrete channel sets. FIG. 2 references the twelve discrete channel sets through the use of the characters "A", "B", "C", "D", "E", "F", "G", "H", "I", "J", "K", and "L". Those skilled in the art will appreciate that a different number of channel sets may be used and that, if a different number is used, the resulting assignment of channel sets to cells 28 will differ from the assignment pattern depicted in FIG. 2. Likewise, those skilled in the art will appreciate that each channel set may include one channel or any number of orthogonal channels therein.

Figures 3, 4:
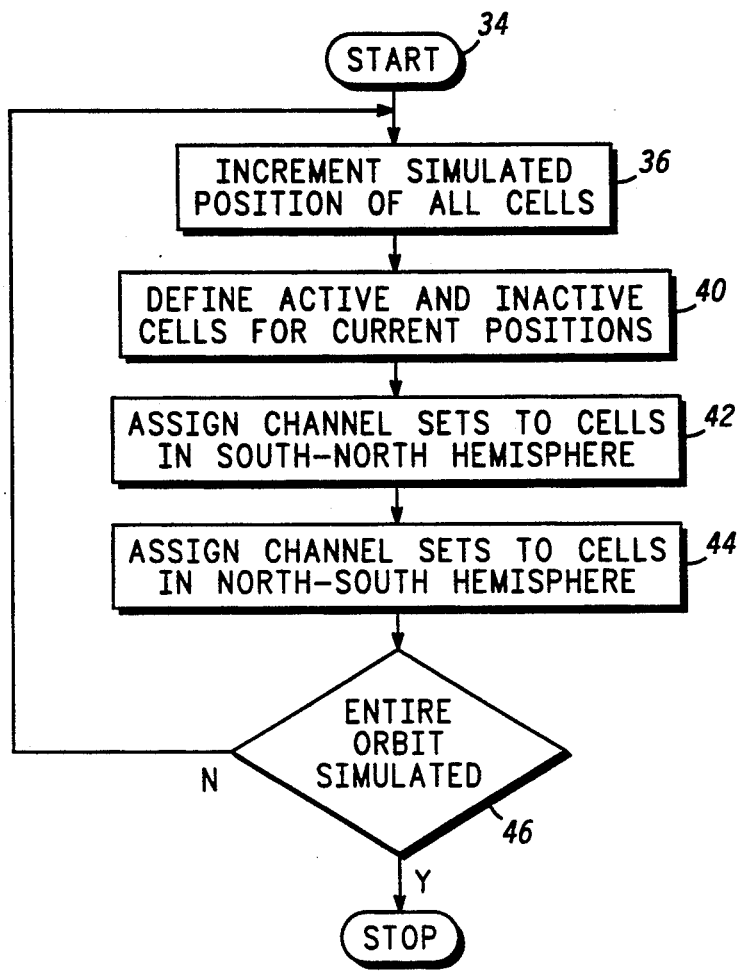
FIG. 3 shows a flow chart of a procedure used to assign discrete portions of spectrum to cells.
FIG. 4 shows a block diagram of a position table used by the procedure of FIG. 3.

FIG. 3 shows a flow chart of a procedure 34 used in one embodiment of the present invention to assign particular channel sets to particular cells 28. The procedure depicted in FIG. 3 may be practiced on a general purpose computer or on-board one or more satellites 12, a block diagram of which is presented below in connection with FIG. 12. Those skilled in the art will appreciate that a general purpose computer may include one or more processors (not shown) which perform steps described in the flow chart of FIG. 3 in response to instructions stored in a memory (not shown) thereof.

Procedure 34 performs a task 36 to simulate the position of all cells 28 relative to one another. For a first iteration of procedure 34, any position for the constellation of satellites 12 will suffice. For subsequent iterations, the simulated positions are desirably the positions which result from the movement of satellites 12 within orbits 14 away from a position associated with the previous iteration of procedure 34 for a predetermined increment of time. In the preferred embodiment, this increment approximates a one cell diameter displacement from corresponding positions used in the previous iteration.

Task 36 may record the position of each cell 28 in a table similar to a position table 38, a block diagram of which is shown in FIG. 4. Each cell's position may be expressed by the cell's latitude and longitude, or in any other convenient form. The position data may be calculated by applying conventional trigonometric techniques to orbital and antenna geometries. In particular, the cells' positions may be determined from the orbits' positions, the satellites' speed, orbits' distance from the earth, and angles of displacement for various beams supported by the satellites' antennas away from the satellites' Nadir directions. The positions recorded in table 38 may desirably describe the location of the center of each cell 28 on the surface of the earth. If each footprint 30 includes forty-eight of cells 28 and the constellation includes seventy-seven of satellites 12, then task 36 describes 3696 positions. If each footprint 30 includes thirty-seven of cells 28 and the constellation includes seventy-seven of satellites 12, then task 36 describes 2849 positions.

With reference back to FIG. 3, after task 36 a task 40 defines each cell generated from the operation of the constellation of satellites 12 as being either active or inactive. Active cells may be viewed as being turned "on" while inactive cells may be viewed as being turned "off". Satellites 12 will refrain from broadcasting transmissions within inactive cells 28, and any signals received at satellites 12 from inactive cells 28 will be ignored. Satellites 12 transmit/receive signals to/from active cells using channel sets assigned to the respective active cells.

Generally speaking, task 40 may be performed by analyzing the positions recorded in table 38 (see FIG. 4)

during task 36. The distances between the center of each cell and the centers of all other cells may be compared with a predetermined distance. When the distance between two of cells 28 is less than this predetermined distance, an overlap is declared between the two cells. In the preferred embodiment, an overlap is declared when at least 70% of two cells 28 occupy the same area. Task 40 then determines which of the two overlapping cells 28 to define as being inactive to cure the overlap. Generally, task 40 defines a cell 28 located toward the outer region of its footprint 30 as being inactive rather than an overlapping cell 28 located closer to the center region of its footprint 30. Any cell which is not declared as being inactive is defined to be active. Additional details related to the operation of task 40 may be obtained from the above-referenced related patent.

After task 40, a task 42 assigns channel sets to all active cells in the south-north hemisphere of the constellation of satellites 12. As discussed above in FIG. 1, this hemisphere is separated from a north-south hemisphere by seam 16. These assignments are preferably recorded in position table 38 (see FIG. 4) in association with each cell's identity. Details related to the assignment of channel sets to cells are discussed below in connection with FIGS. 5-11. After the completion of task 42, a task 44 repeats this assignment procedure, except that task 44 assigns channel sets for the north-south hemisphere of the constellation of satellites 12.

After task 44, a query task 46 determines whether cell positions for an entire orbit have been simulated. If the entire orbit has not been simulated yet, program control loops back to task 36 to increment the cells' positions and repeat the assignment process. If task 46 determines that the entire orbit has been simulated, then procedure 34 may stop because channel set to cell assignments for additional positions will generally duplicate previous assignments recorded in table 38 (see FIG. 4).

Satellites 12 may then use this assignment data in controlling the operation of their transceivers and antennas, as discussed below in connection with FIGS. 12-14. Preferably, procedure 34 is performed "off-line" and only those channel set to cell assignments for an entire orbit which result from procedure 34 and relate to a given satellite 12 are recorded in the memory of that satellite 12. However, in an alternate embodiment, satellites 12 may perform procedure 34, or portions of it, themselves and utilize the resulting channel set to cell assignments to control their transceiver's and antenna's operations. In this alternative embodiment, the loop depicted in FIG. 3 may repeat indefinitely, with each iteration of the loop simulating the positions of the satellites' cells just prior to the time when the cells actually reach the simulated positions. The resulting assignments will then be available when needed, and additional assignments will not be needed until the satellite movement causes cells to move to their incremented positions.

Figure 5:
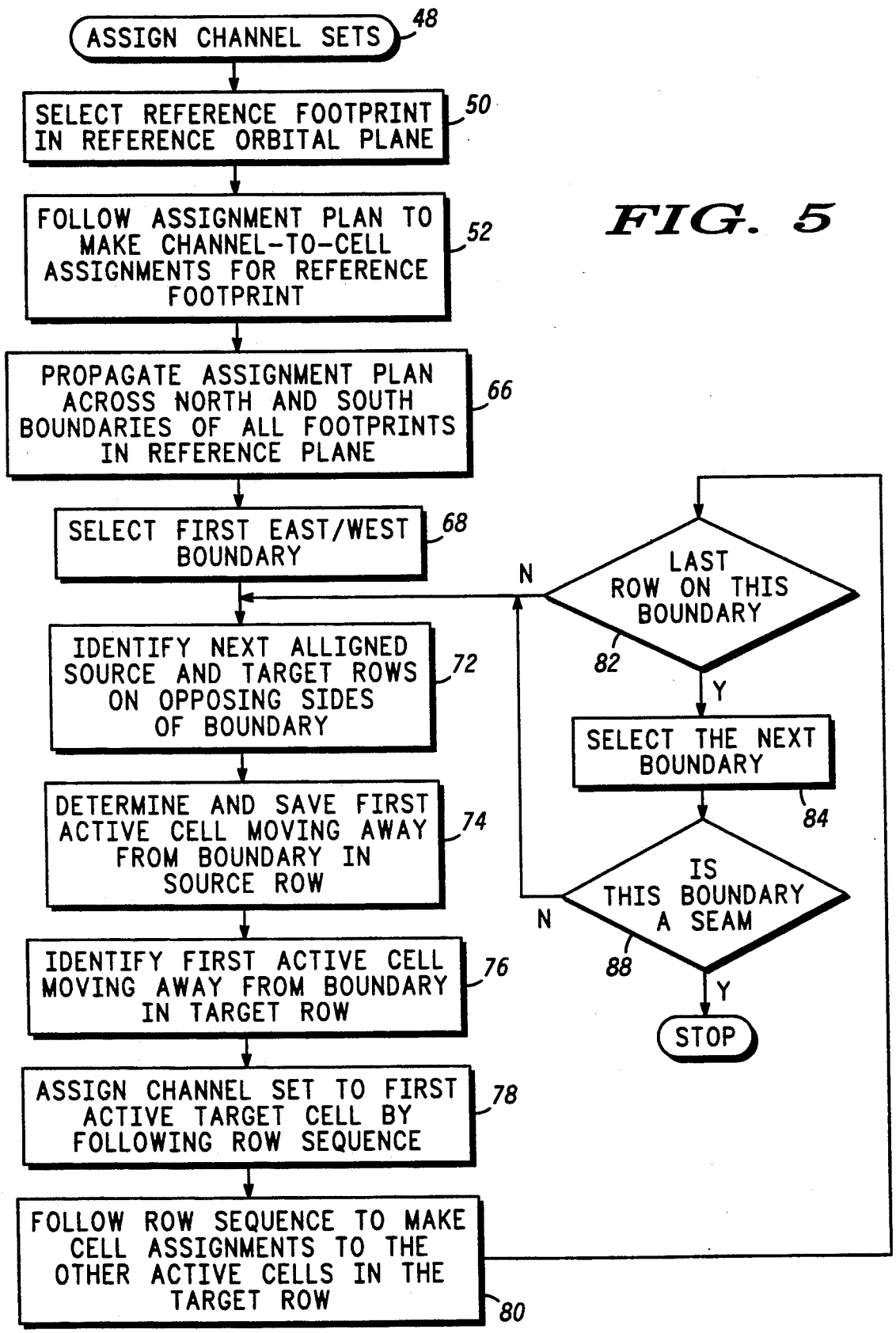
FIG. 5 shows a flow chart of an Assign Channel Sets procedure used by the procedure depicted in FIG. 3.

FIG. 5 shows a flow chart of an Assign Channel Sets procedure 48 which is used by tasks 42 and 44 of procedure 34 (see FIG. 3) to assign channel sets to the cells generated by one hemisphere of the constellation of satellites 12. A task 50 in procedure 48 selects a reference footprint 30a in a reference orbital plane 14a, as shown in FIG. 6.

Figure 6:
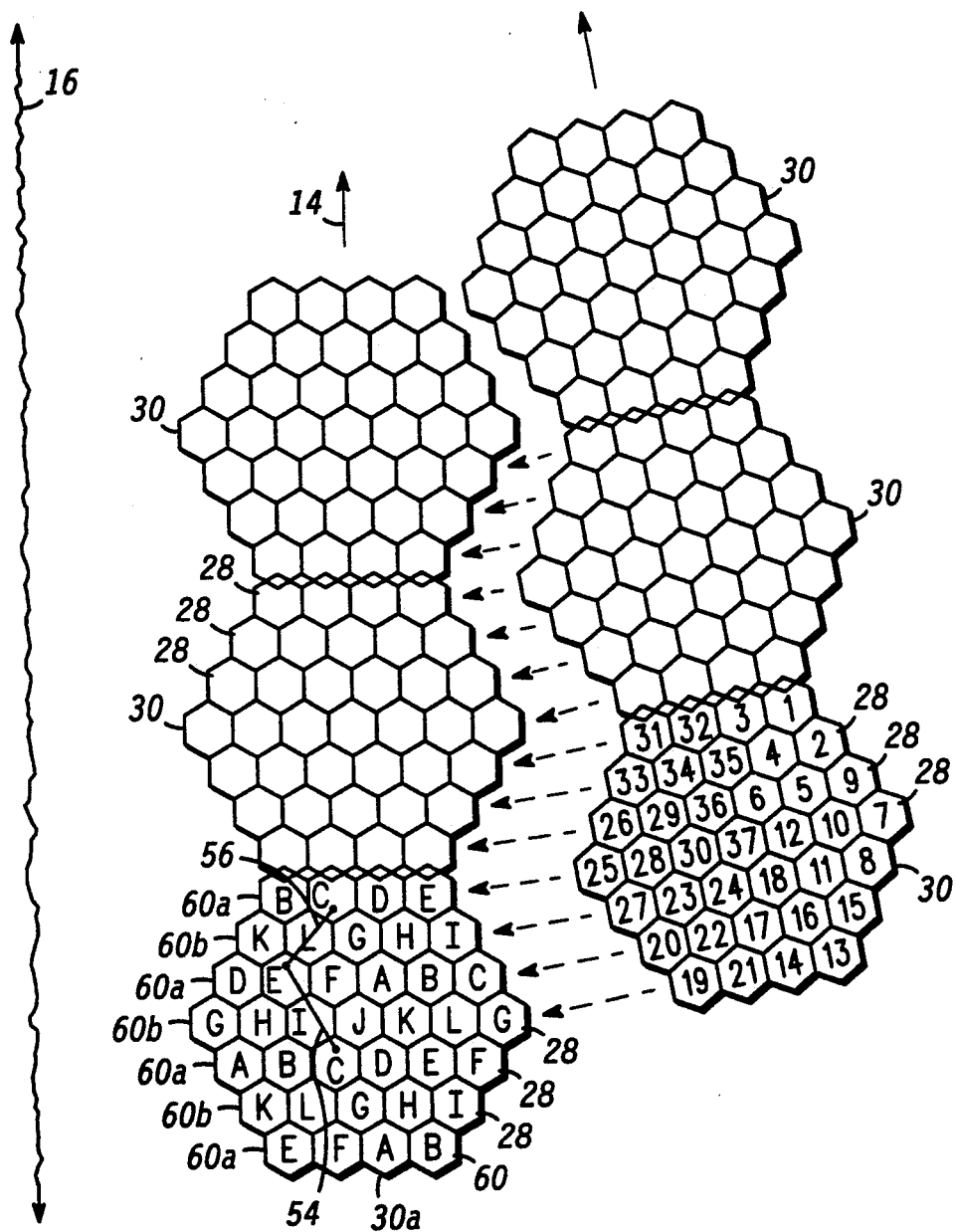
FIG. 6 shows an exploded layout diagram of a portion of a cellular pattern formed on the surface of the earth and exemplary assignments made at a first stage in the procedure depicted in FIG. 5.

FIG. 6 shows an exploded layout diagram for six of footprints 30. FIG. 6 is similar to the layout diagram shown in FIG. 2. However, FIG. 6 illustrates a system which uses thirty-seven cells 28 per footprint 30 rather than the forty-eight cells 28. In addition, FIG. 6 is an exploded diagram because the footprints 30 produced by satellites 12 in one orbit 14 are spaced apart from the footprints 30 produced by satellites 12 in an adjacent orbit 14. FIG. 6 illustrates actually overlapping footprints 30 as being separated to clarify the below-discussed procedure for assigning channel sets to cells.

While any footprint 30 in the selected hemisphere may serve as reference footprint 30a, task 50 (see FIG. 5) in the preferred embodiment utilizes an equatorially located footprint 30 in an orbital plane 14 adjacent to seam 16 (see FIG. 1). After task 50, a task 52 follows a channel set assignment plan to assign channel sets to the cells 28 located within reference footprint 30a. FIG. 6 shows an exemplary twelve cell reuse pattern that task 52 assigns to cells 28 of reference footprint 30a. In other words, twelve discrete channel sets are distributed among cells 28 of footprint 30a so that co-channel cells are spaced a minimum predetermined distance apart from one another.

Those skilled in the art will appreciate that footprints 30 located in the two hemispheres may use different channel sets to prevent interference at seam 16.

Task 52 may assign channel sets using the plan or formula:

$$N = i^2 + j^2 + i*j$$

where,
N = the number of discrete channel sets available in the spectrum being assigned;
i = a shift parameter for a first direction;
j = a shift parameter for a second direction; and
i ≧ j.

Using this formula, co-channel cells are determined by moving "i" cells in a first direction away from a source cell, as shown by line segment 54 in FIG. 6, then rotating clockwise (or counter-clockwise) 60° and moving "j" cells, as shown by line segment 56 in FIG. 6. The results from applying this assignment plan for all cells 28 within footprint 30a are then recorded in a memory structure, such as position table 38 (see FIG. 4).

In an alternate embodiment, task 52 (see FIG. 5) may use a table (not shown) which associates channel set assignments with cell numbers. In connection with another one of footprints 30, FIG. 6 shows an exemplary assignment of cell numbers to cells 28. These cell numbers are indicated by the numerals 1-37 in FIG. 6. Each footprint 30 preferably uses the same cell numbering scheme. The cell numbers are used to identify cells 28 in position table 38 (see FIG. 4) and other memory structures used by procedures 34 (see FIG. 3) and 48. Those skilled in the art will appreciate that the particular assignment of cell numbers to cells 28 is arbitrary and that, so long as each cell 28 within a footprint 30 has its own unique identifier, other cell numbering schemes may be used as well. In this alternate embodiment, task 52 may assign channel sets to the cells 28 of reference footprint 30a by copying channel set assignments to an appropriate section of a memory structure, such as position table 38.

In yet another embodiment of the present invention, task 52 may utilize one table (not shown) to assign a channel set to one predetermined cell in each row 60 of reference footprint 30a. Then, this embodiment may use a row sequence table 62, such as that illustrated in FIG. 7, to propagate the assignments left and/or right, with respect to the direction of movement of satellite 12, within each row 60 until the boundaries of footprint 30a have been reached. The locations of each cell 28 in a footprint 30 may be determined from any subject cell in the footprint 30 by reference to a cell location table 64, such as that shown in FIG. 8. Using table 64, a table look-up operation may be performed to determine which cell is located immediately in left, right, up left, up right, down left, or down right directions from any other cell within a footprint 30.

Those skilled in the art will appreciate that tables 62 and 64 shown in FIGS. 7-8 illustrate only one exemplary situation. Row sequence table 62 is applicable to a twelve cell reuse assignment plan and cell location table 64 is applicable to a thirty seven cell footprint 30 having cell number assignments as depicted in FIG. 6. Other similar tables or memory structures may be fashioned to achieve an acceptable assignment plan that spaces co-channel cells a predetermined distance apart from one another for a different number of discrete channel sets in a spectrum, for a different number of cells per footprint, and/or a different channel numbering scheme.

Regardless of the particular assignment plan process used, task 52 assigns channel sets to cells 28 within footprint 30a in alternating rows 60. For the example shown in FIG. 6, channel sets A-F are confined to rows 60a and channel sets G-L are confined to rows 60b. Rows 60a and 60b are interleaved with one another. In addition, a constant pattern of channel set assignments results from progressing through cells 28 up-right (A-H-E-L-C-J, B-I-F-G-D-K) or up-left (A-G-C-I-E-K, B-H-D-J-F-L). Of course, the opposite sequences result from progressing through cells 28 down-left or down-right, respectively.

With reference back to FIG. 5, after task 52, a task 66 propagates the assignment plan across northern and southern boundaries for all footprints 30 within the reference plane 14a. Propagation of the assignment pattern across a northern boundary may be achieved by following the above-discussed up-right and up-left sequences or the above-discussed assignment formula. Propagation of the assignment pattern across a southern boundary may be achieved by following the above-discussed down-right and down-left sequences or the above-discussed assignment formula. Cell location table 64 (see FIG. 8) may be consulted to determine which cells 28 of an unassigned footprint 30 located immediately to the north or south of an assigned footprint 30 are the initial targets in following these sequences.

Those skilled in the art will appreciate that cell location table 64 (see FIG. 8) records an additional 30° of rotation across a footprint's northern and southern boundaries in addition to the 60° discussed above in connection with the assignment formula. This additional 30° is accounted for in the identity of cells located across northern or southern boundaries from a source cell. This additional 30° is needed because thirty-seven cell footprints, and other footprints which have a single centrally located cell 28, do not smoothly mate together at these boundaries, as illustrated in FIG. 6. In contrast, forty-eight cell footprints, and other footprints which do not have a single centrally located cell 28, smoothly mate together at these boundaries, as illustrated in FIG. 2. When a network employs footprints not having a single centrally located cell 28, the additional 30° of rotation is not needed.

Figure 9:
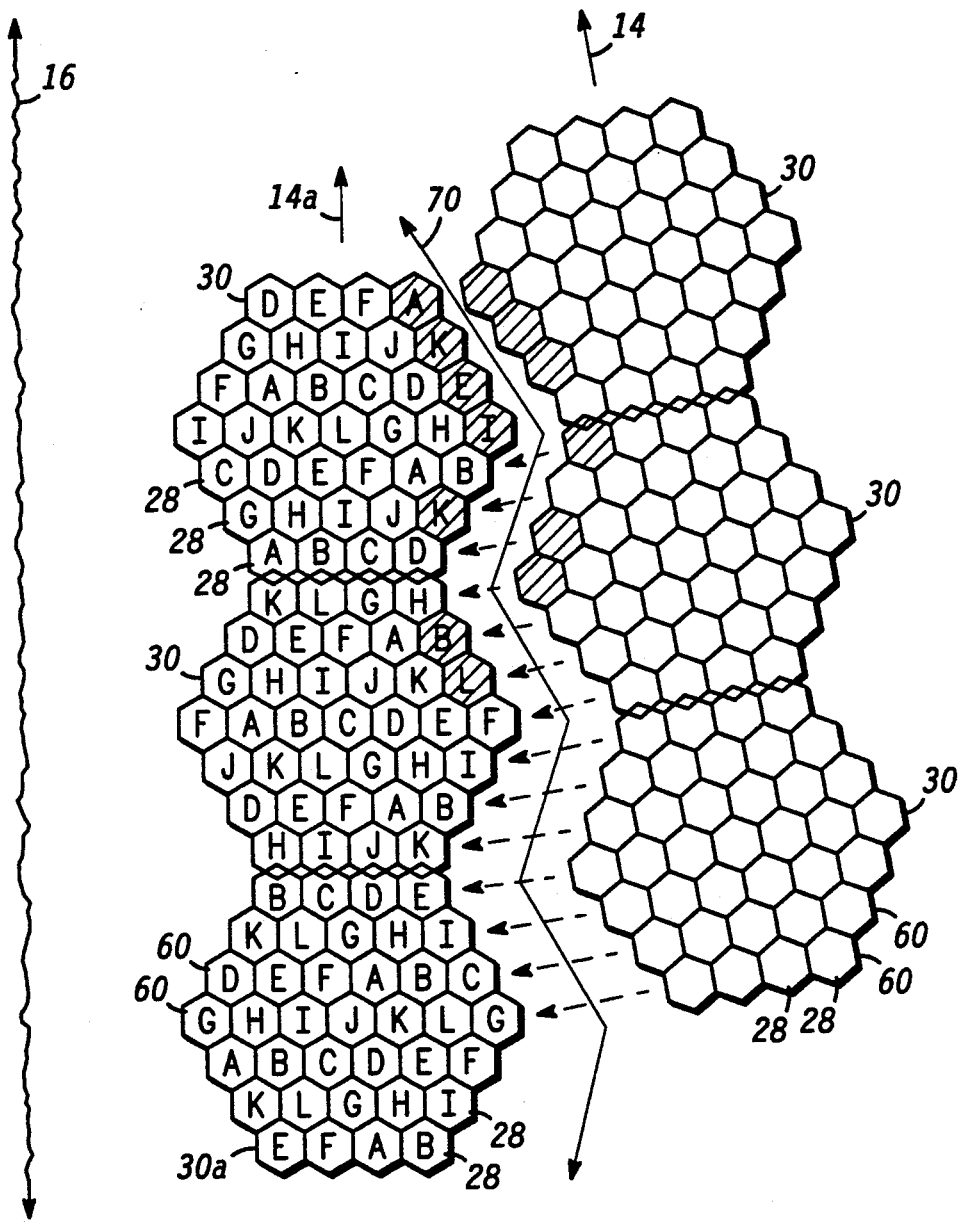
FIG. 9 shows an exploded layout diagram of a portion of a cellular pattern formed on the surface of the earth and exemplary assignments made at a second stage in the procedure depicted in FIG. 5.

FIG. 9 shows an assignment of channel sets to cells in footprints 30 located in the reference plane 14a after the performance of task 66. Of course, task 66 also assigns channel sets to cells 28 of footprints 30 located to the south of reference footprint 30a even though such southern footprints 30 are not depicted in FIG. 9. FIG. 9 also indicates by cross-hatching that certain ones of cells 28 have been defined as being inactive through the operation of task 40 (see FIG. 3).

After task 66 (see FIG. 5), a task 68 selects a first east/west boundary 70 between orbital planes 14. Preferably, the first boundary 70 is located on the opposing side of reference plane 14a from seam 16. Some of the inactive cells 28 are located near boundary 70, and more inactive cells are located in polar regions than in equatorial regions. FIG. 9 illustrates an assignment of channel sets to inactive cells in reference plane 14a. However, it is unimportant whether channel sets are actually assigned to inactive cells.

After task 68, a task 72 (see FIG. 5) identifies aligned source and target rows 60 on opposing sides of boundary 70. Referring to FIG. 9, source rows 60 are confined to a single footprint 30 that is located on a previously assigned side of boundary 70. Target rows 60 are confined to a single footprint 30 located on an unassigned side of boundary 70. Aligned source and target rows 60 are indicated in FIG. 9 by dotted lines. Cell location table 64 (see FIG. 8) may be used to identify a specific cell 28 in a specific footprint 30 which is aligned with a target row. For the example depicted in FIGS. 8-9, cells 28 located to the right of the right-most cells 28 in a previously assigned footprint 30 reside in the target row. For the first iteration of task 72, any of source and target rows 60 that are aligned may be selected.

With reference to FIGS. 5 and 9, after task 72 a task 74 determines the first active cell 28 encountered while moving away from boundary 70 in the source row 60 selected above in task 72. After identifying this first active cell 28, task 74 records the identity of the channel set assigned to it. After task 74, a task 76 identifies the first active cell encountered while moving away from boundary 70 in the target row 60 selected above in task 72.

After tasks 74 and 76, a task 78 assigns a channel set to this first active cell in the target row 60. The assignment is made by following the row sequence from the channel set recorded above in task 74. The row sequence may be determined, for example, by referring to row sequence table 62 (see FIG. 7). Starting from this first active cell in the target row and proceeding away from boundary 70, a task 80 follows the row sequence to assign channel sets to the remaining cells in the target row of the target footprint 30. Row sequence table 62 (see FIG. 7) and cell location table 64 (see FIG. 8) may be used in making these channel set assignments.

After tasks 72-80, a query task 82 determines whether the previously assigned target row 60 is the last row to be assigned on boundary 70. So long as additional rows 60 remain to be assigned, program control repeats tasks 72-82 to assign channel sets to other rows along boundary 70.

Figure 10:
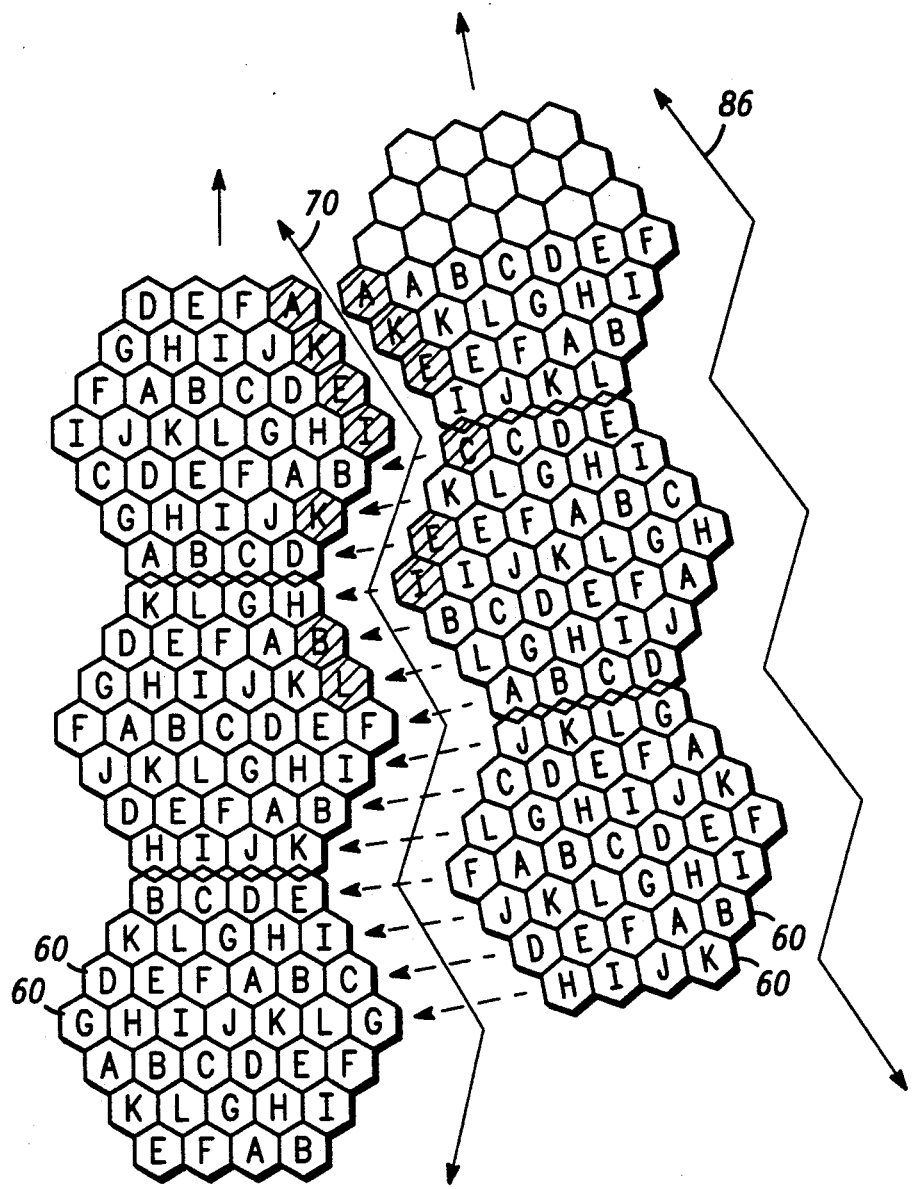
FIG. 10 shows an exploded layout diagram of a portion of a cellular pattern formed on the surface of the earth and exemplary assignments made at a third stage in the procedure depicted in FIG. 5.

When all rows on boundary 70 have been assigned, the resulting assignment resembles the situation depicted in FIG. 10. As discussed above, it is unimportant whether channel sets are assigned to inactive cells. When all rows on boundary 70 have been assigned, a task 84 (see FIG. 5) selects another boundary 86 which is preferably on the opposing side of the target footprints 30 from boundary 70. Next, a query task 88 (see FIG. 5) determines whether the selected boundary 86 is located on a seam 16 (see FIG. 1). So long as the new boundary 86 is not located on a seam 16, tasks 72-84 are repeated to propagate the channel set assignments across the selected hemisphere. When channel sets have been assigned to cells 28 located on seam 16, procedure 48 stops.

Figure 11:
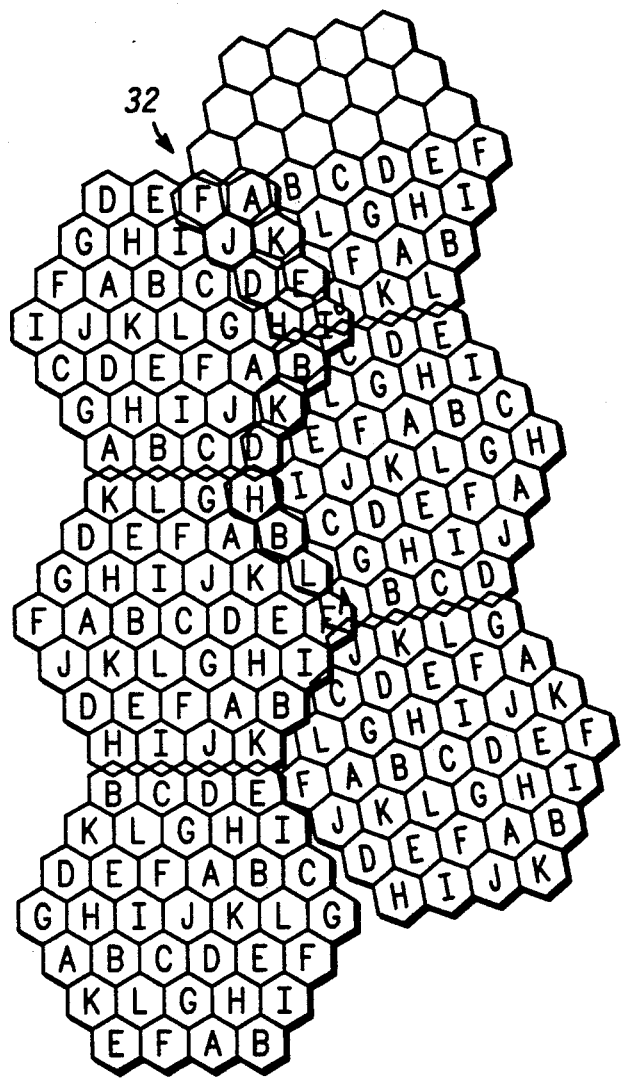
FIG. 11 shows a layout diagram of a portion of a cellular pattern formed on the surface of the earth and exemplary assignments made upon completion of the procedure depicted in FIG. 5.

FIG. 11 illustrates an exemplary assignment pattern that results from the performance of tasks 72-84 and accounts for overlap 32. As a result of performing tasks 72-84, channel sets are assigned to cells in target rows of a footprint 30 by following the row sequence and keying off of the channel set assigned to the last active cell in the source row. Consequently, the assignment of channel sets in the target row is responsive to the assignments made in the active cells of a corresponding source row and to any inactive cells residing in either or both of the source and target rows. By following the row sequence but skipping the inactive cells, a minimum separation distance between co-channel cells is maintained across boundary 70.

Those skilled in the art will appreciate that the occasional skipping of cells in the channel assignment plan and the above-discussed 30° rotation will cause the up-right, up-left, down-right, and down-left sequences discussed above to be altered in various locations after crossing a boundary 70. This alteration will have only a small impact on the minimum separation between co-channel cells because it occurs in a north-south direction between rows 60 and not in an east-west direction within any single row 60. As discussed above, channel set assignments follow sequences which repeat within interleaved rows. Consequently, all channel sets assigned to rows located immediately to the north and south of a subject row are orthogonal to each channel set in the subject row. In accordance with the procedure discussed herein, co-channel cells maintain a minimum separation distance which is at least as great as the diameter of a single cell 28.

Figure 12:
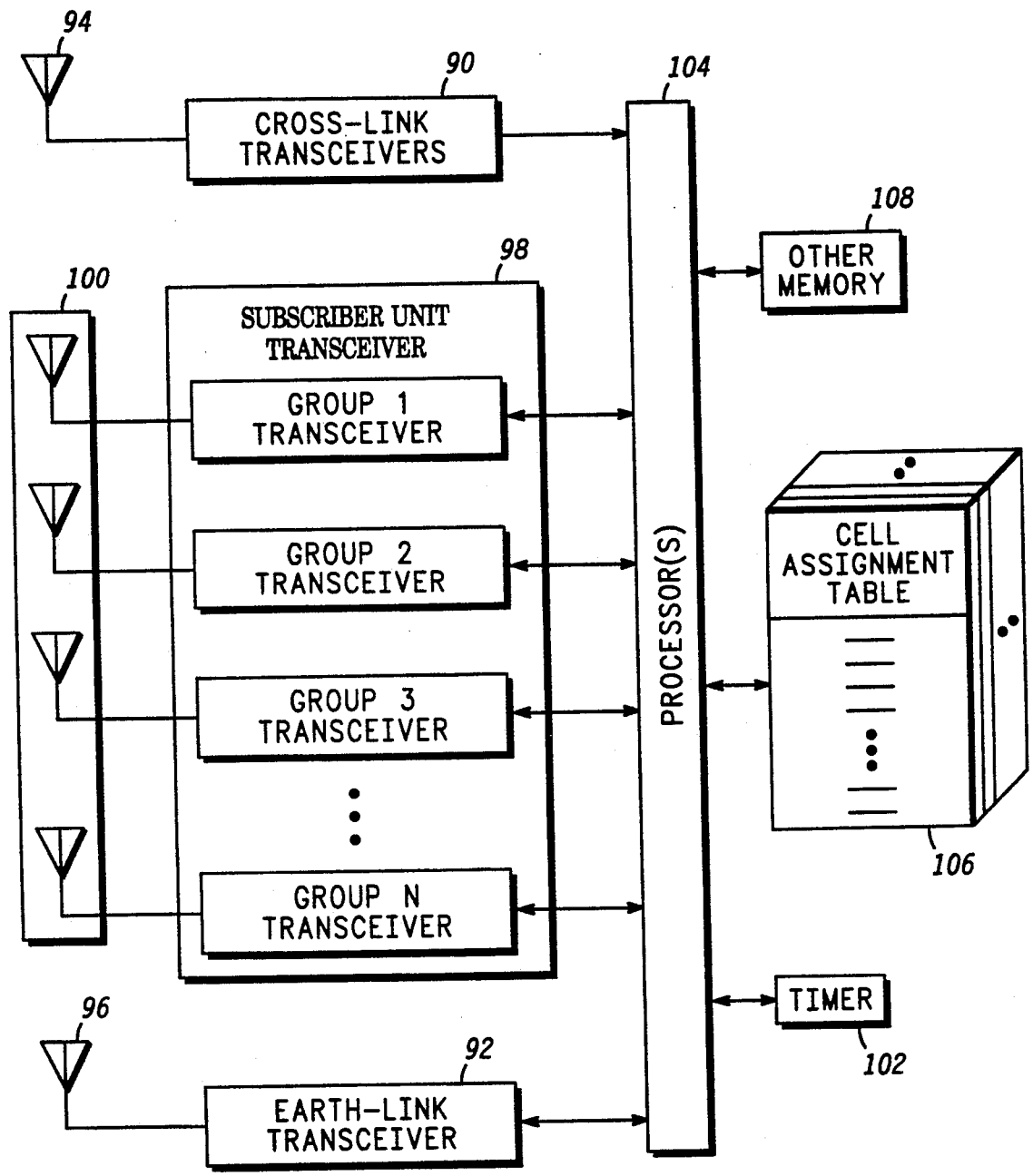
FIG. 12 shows a block diagram of a satellite constructed in accordance with the teaching of the present invention.

FIG. 12 shows a block diagram of a satellite 12 used by network 10 (see FIG. 1). In the preferred embodiment, all satellites 12 within network 10 have substantially the same structure for the purposes of the present invention. Thus, FIG. 12 depicts each and every one of satellites 12. Satellite 12 includes any number of transceivers. For example, cross link transceivers 90 serve communication links between a satellite 12 and other nearby satellites 12 (see FIG. 1). In addition, satellite 12 includes one or more earth-link transceivers 92 which support communication links to CSOs 22 and GCSs 24. Transceivers 90 and 92 communicate via their respective antennas 94 and 96. Satellite 12 additionally includes a subscriber unit transceiver 98. Transceiver 98 communicates with subscriber units 26 through a multibeam, multi-directional antenna 100. Transceiver 98 and antenna 100 may be divided into any number of independent channels, segments, or groups so that discrete cells 28 are formed and discrete channel sets are supported.

Each of transceivers 90, 92, and 98, along with various memory components and a timer 102 couple to a controller 104. Controller 104 may be implemented using a single processor or multiple processors operated in a parallel architecture. Generally speaking, controller 104 coordinates and controls transceivers 90, 92, and 98 along with their associated antennas so that satellite 12 receives data communications from receivers of the various communication links and appropriately distributes the received communications among transmitters for the various communication links. Timer 102 is utilized to synchronize controller 104 and satellite 12 with timing constraints imposed by network 10 (see FIG. 1).

The memory components include a cell assignment table 106. Table 106 associates channel set assignments with cell identities in a one to one correspondence. Table 106 may also record which, if any, of the cells 28 in the footprint 30 generated by satellite 12 are to be inactive. Thus, by supplying a cell number to table 106, a channel set assigned to the identified cell or data defining whether the cell is active or inactive may be obtained. The channel set to cell assignments may be determined as described above in connection with FIGS. 3-11. Moreover, as discussed above each cell may have numerous channel sets assigned thereto, with particular ones of the numerous channel sets being responsive to corresponding positions of satellite 12 within its orbit 14.

The memory components also include other memory 108. Memory 108 includes data which serve as instructions to controller 104 and which, when executed by processor(s) within controller 104, cause satellite 12 to carry out procedures that are discussed below. Memory 108 also includes other variables, tables, and databases that are manipulated due to the operation of satellite 12.

Figure 13:
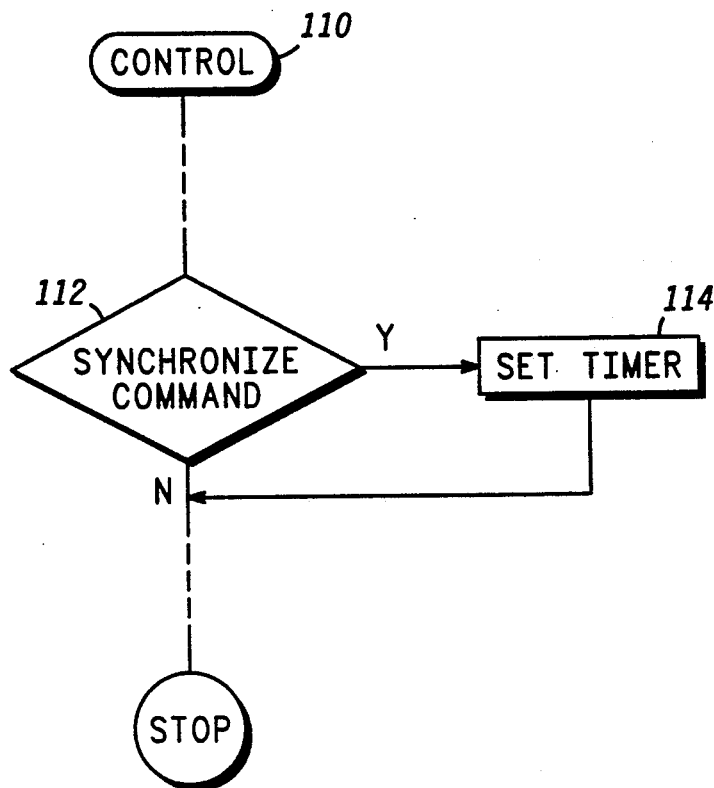
FIG. 13 shows a flow chart of a Control procedure performed by a satellite to synchronize internal timing.

FIG. 13 shows a flow chart of a Control procedure 110 performed by a single satellite 12 within network 10. Procedure 110 causes satellite 12 to become synchronized to an external timing signal. Those skilled in the art will appreciate that, while procedure 110 is described for a single satellite 12, each of satellites 12 desirably performs substantially the same procedure. Generally speaking, Control procedure 110 is invoked when a TT&C command is received from a GCS 24 (see FIG. 1). TT&C may involve numerous diverse commands, such as orbit control commands, diagnostics commands, and programming commands, to name a few.

Such TT&C commands may additionally include a synchronizing command. When the synchronizing command is detected, as indicated at a query task 112, program control retrieves data from the synchronizing command and programs timer 102 (see FIG. 12) in response to synchronization data carried by the command, as shown in a task 114. In the preferred embodiment, satellites 12 come within view of a GCS 24 every few orbits. Thus, they may synchronize their internal time to the system time for network 10 every few hours. With every satellite 12 performing substantially the same procedure, the internal timers 102 of all satellites 12 recognize a given point in time at substantially the same instant. In the preferred embodiment, timers 102 for all of satellites 12 remain synchronized to within 50 microseconds of one another. After synchronization, procedure 110 may engage in other TT&C activities not related to the present invention. Due to the operation of procedure 110, all satellites 12 within network 10 recognize a given instant at substantially the same actual absolute point in time.

Figure 14:
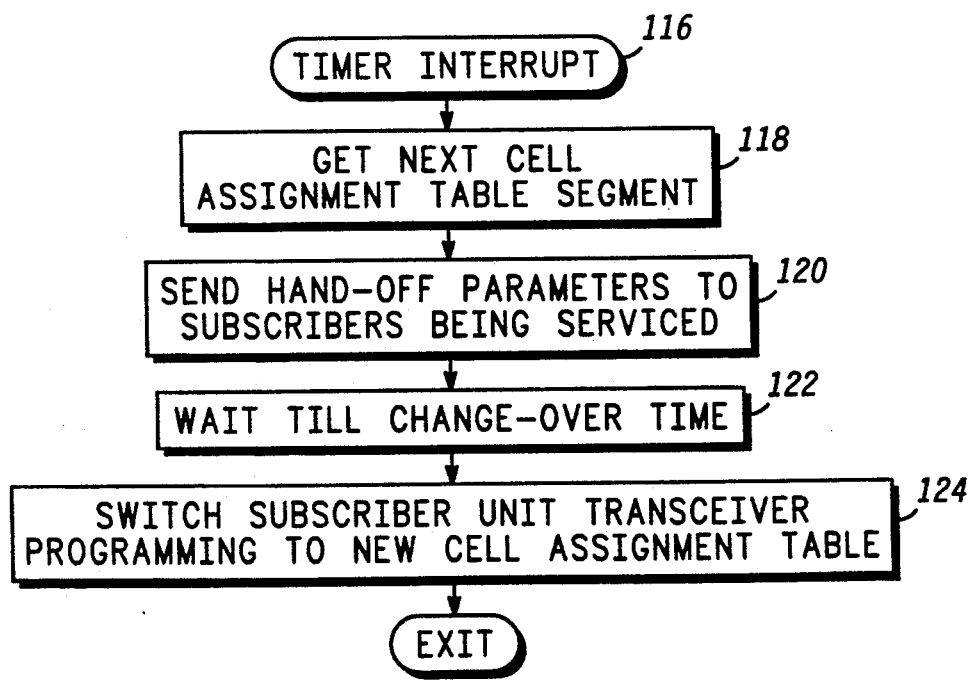
FIG. 14 shows a flow chart of a Timer Interrupt procedure performed by a satellite to switch cell spectrum assignments.

FIG. 14 shows a flow chart of a Timer Interrupt procedure 116 which is performed by a single satellite 12 within network 10. Procedure 116 causes satellite 12 to change the assignments of channel sets to cells with which it is operating into a new set of assignments. While procedure 116 is described for a single satellite 12, each of satellites 12 desirably performs substantially the same procedure. Generally speaking, Timer Interrupt procedure 116 is invoked in response to a signal supplied from timer 102 (see FIG. 12). Upon entry into procedure 116, a task 118 obtains the next segment of cell assignment table 106. This next segment includes either the identity of channel sets to be assigned to each of the satellite's cells upon the occurrence of an upcoming event or the identity of those cells and channel sets that will change as a result of the upcoming event.

After task 118, a task 120 causes satellite 12 to communicate with those subscriber units 26 (see FIG. 1) currently supported by satellite 12. In particular, satellite 12 informs such units 26 of an upcoming change in the identity of the channels over which communications are taking place. Such communications concerning upcoming changes in channel identities are called "hand-off" communications. After task 120, a task 122 waits until a particular point in time occurs. This particular point in time represents the upcoming event discussed above in connection with task 118. It is a predetermined point in time at which all satellites 12 within network 10 will change their channel set to cell assignments to compensate for overlap in their footprints 30 as they orbit the earth. The occurrence of this point in time may be determined from timer 102. As discussed above, procedure 110 (see FIG. 13) synchronizes all satellites 12 so that each satellite 12 recognizes this point in time at substantially the same instant.

After task 122, a task 124 programs subscriber unit transceiver 98 (see FIG. 12) so that its operational programming switches in accordance with the active/inactive status and channel set assignment data obtained above in connection with task 118. After task 124, program control leaves procedure 116. Procedure 116 will be executed again when satellite 12 reaches the point in its orbit that corresponds to the next segment of assignment table 106 (see FIG. 12). Until procedure is executed again, satellite 12 will communicate through antenna 100 in accordance with these updated channel set to cell assignments.

In summary, the present invention provides an improved communication system. The present invention relates to a cellular communication system that efficiently reuses spectrum throughout a spherical surface, such as the surface of the earth. The spectrum is efficiently used because channel set to cell assignments are made in a manner which recognizes overlap between footprints, marks certain overlapped cells as being inactive, and assigns channel sets to active cells in a manner which is responsive to the inactive cells. Furthermore, in accordance with the present invention the marking of certain overlapped cells as being inactive and the assignment of channel sets to active cells are repeated from time to time to compensate for dynamic variance occurring in the overlap.

The present invention has been described above with reference to preferred embodiments. However, those skilled in the art will recognize that changes and modifications may be made in these preferred embodiments without departing from the scope of the present invention. For example, others may devise alternate procedures to accomplish substantially the same functions as those described herein. Memory structures other than those depicted herein may by employed. Moreover, while the preferred embodiments described herein relate to a particular orbital geometry, footprint geometry, and channel set size, those skilled in the art will appreciate that the present invention may be applied to different geometries and channel set sizes. These and other changes and modifications which are obvious to those skilled in the art are intended to be included within the scope of the present invention.

What is claimed is:

1. A method of operating first and second spaced apart antennas, said first and second antennas projecting first and second footprints, respectively, said first and second footprints each being divided into a plurality of cells, said method comprising the steps of:
    positioning said antennas so that said first and second footprints overlap;
    defining said cells of said footprints as being active or inactive in response to said overlap; and
    assigning channels to said active ones of said cells of said first and second footprints in accordance with a spectrum reuse plan that maintains a minimum predetermined separation distance between co-channel cells.

2. A method as claimed in claim 1 wherein:
    said positioning step comprises the step of moving said first antenna relative to said second antenna so that the amount of overlap between said first and second footprints varies; and
    said method additionally comprises the step of repeating said defining and assigning steps to compensate for variation in said overlap between said first and second footprints.

3. A method as claimed in claim 2 wherein said assigning step is performed separately in connection with said first and second antennas.

4. A method as claimed in claim 3 wherein assignments resulting from said assigning step for said first antenna and from said assigning step for said second antenna take effect at substantially the same instant.

5. A method as claimed in claim 1 wherein said assigning step comprises the steps of:
    storing a first set of channel-to-cell assignments in a first memory;
    programming a first transceiver that couples to said first antenna with said first set of channel-to-cell assignments;
    storing a second set of channel-to-cell assignments in a second memory; and
    programming a second transceiver that couples to said second antenna with said second set of channel-to-cell assignments.

6. A method as claimed in claim 5 wherein said positioning step comprises the step of moving said first antenna relative to said second antenna so that the amount of overlap between said first and second footprints varies, and said method additionally comprises the steps of:
    storing a third set of channel-to-cell assignments in said first memory;
    storing a fourth set of channel-to-cell assignments in said second memory; and
    at a predetermined point in time, programming said first transceiver with said third set of channel-to-cell assignments and said second transceiver with said fourth set of channel-to-cell assignments.

7. A communication system which has an area of coverage directed to an approximately spherical surface and which reuses a given amount of spectrum throughout said area of coverage, said system comprising:
    a first antenna configured to project a first footprint on said surface, said first footprint being divided into a plurality of cells;
    a second antenna configured to project a second footprint on said surface, said second footprint being divided into a plurality of cells, and said second footprint overlapping at least a portion of said first footprint at least on occasion;

a first transceiver coupled to said first antenna;

a second transceiver coupled to said second antenna;

a first memory coupled to said first transceiver and configured to store a first set of channel-to-cell assignments; and a second memory coupled to said second transceiver and configured to store a second set of channel-to-cell assignments, said first and second memories being configured so that said first and second sets of assignments control allocation of said spectrum to said first and second transceivers, respectively, to maintain a predetermined separation distance between co-channel cells.

8. A system as claimed in claim 7 additionally comprising:

a first controller coupled between said first memory and said first transceiver;

a second controller coupled between said second memory and said second transceiver; and means, associated with said first and second controllers, for synchronizing operation of said transceivers so that said spectrum is allocated at said first and second transceivers substantially simultaneously.

9. A system as claimed in claim 7 wherein said first and second memories additionally store third and fourth sets, respectively, of channel-to-cell assignments, and said system additionally comprises:

first means, coupled to said first transceiver, for changing said allocation of spectrum within said first footprint from an allocation defined by said first set of assignments into an allocation defined by said third set of assignments; and second means, coupled to said second transceiver, for changing said allocation of spectrum within said second footprint from an allocation defined by said second set of assignments into an allocation defined by said fourth set of assignments.

10. A system as claimed in claim 9 additionally comprising means, coupled to said first and second changing means, for causing spectrum allocation changes at said first and second transceivers to take place substantially simultaneously.

11. A system as claimed in claim 7 wherein said first antenna moves relative to said second antenna and the amount of overlap between said first and second footprints varies in response to said movement.

12. A method of reusing spectrum on an approximately spherical surface, said method comprising the steps of:

(a) simulating locations for first and second footprints projected on said surface from corresponding first and second antennas positioned outside said surface, each footprint being divided into a plurality of cells, and said first and second footprints at least partially overlapping one another;

(b) assigning channels of said spectrum to said first footprint cells in accordance with a spectrum assignment plan that spaces co-channel cells a predetermined distance apart;

(c) defining active and inactive cells, said inactive cells being located proximate a boundary between said first and second footprints to compensate for overlap therebetween;

(d) assigning channels of said spectrum to said active cells of said second footprint, said step (d) being responsive to said active cells assigned in said step (b) and to said inactive cells defined in said step (c) to maintain separation between active co-channel cells; and (e) communicating through said antennas in accordance with said assignments of said channels to said active cells in said first and second footprints.

13. A method as claimed in claim 12 wherein said cells of said first and second footprints are arranged in rows, and said step (d) comprises the steps of:

(f) selecting a source row of cells in said first footprint;

(g) identifying a target row of cells in said second footprint, said target row being approximately aligned with said source row;

(h) identifying a first source active cell, said first source active cell being located in said source row and being identified along a direction progressing away from said boundary between said source and said target rows;

(i) identifying a first target active cell, said first target active cell being located in said target row and identified along a direction progressing away from said boundary between said source and target rows; and (j) following a row channel assignment sequence to assign a target channel to said first target active cell, said target channel residing next to a channel assigned to said first source active cell in said row channel assignment sequence.

14. A method as claimed in claim 13 additionally comprising, after said following step, the step of following said row channel assignment sequence to assign additional channels to additional active cells in said target row.

15. A method as claimed in claim 13 additionally comprising the step of repeating said steps (f), (g), (h), (i), and (j) for other rows of said first footprint.

16. A method as claimed in claim 12 wherein a third footprint is projected from a third antenna on an opposing side of said second footprint from said first footprint, said third footprint being divided into a plurality of cells, said third footprint at least partially overlapping said second footprint, and said method additionally comprising the steps of:

defining active and inactive cells for said third footprint; and assigning channels to said active cells of said third footprint so that said cell assignments are responsive to said active cells assigned in said step (d) and to said inactive cells defined for said third footprint.

17. A method as claimed in claim 12 wherein:

said first antenna is located with first additional antennas in a first orbital plane surrounding said surface, each of said first additional antennas being associated with its own footprint which is divided into a plurality of cells;

said second antenna is located with second additional antennas in a second orbital plane surrounding said surface, each of said second additional antennas being associated with its own footprint which is divided into a plurality of cells;

said step (b) assigns channels to all cells in footprints associated with said first orbital plane;

said step (c) defines active and inactive cells for each of said footprints associated with said first and second orbital planes; and said step (d) assigns channels to all cells in footprints associated with said second orbital plane.

18. A method as claimed in claim 17 wherein said first and second orbital planes intersect one another proximate poles of said sphere, and said step (b) comprises the steps of:

selecting a reference footprint from said footprints associated with said first orbital plane;

assigning channels of said spectrum to said cells of said reference footprint; and propagating channel assignments in first and second opposing directions away from said reference footprint until channels have been assigned to cells located proximate said poles.

19. A method as claimed in claim 17 wherein a third orbital plane surrounds said surface on an opposing side of said second orbital plane from said first orbital plane, said third orbital plane including antennas which project third footprints on said surface, each of said third footprints being divided into a plurality of cells, and said method additionally comprising the steps of:

defining active and inactive cells for said third footprints; and assigning channels to said active cells of said third footprints so that said cell assignments are responsive to said active cells assigned in said step (d) and to said inactive cells defined for said third footprints.

20. A method as claimed in claim 12 additionally comprising the steps of:

repeating said steps (a), (b), (c), and (d), said repeating step being performed for a plurality of iterations wherein each iteration uses different locations for said first and second footprints; and saving said channel-to-cell assignments from each iteration of said steps (b) and (d).

* * * * *